(No Model.)
W. OLIPHANT.
FEED WATER HEATING AND FILTERING APPARATUS.
No. 384,540. Patented June 12, 1888.
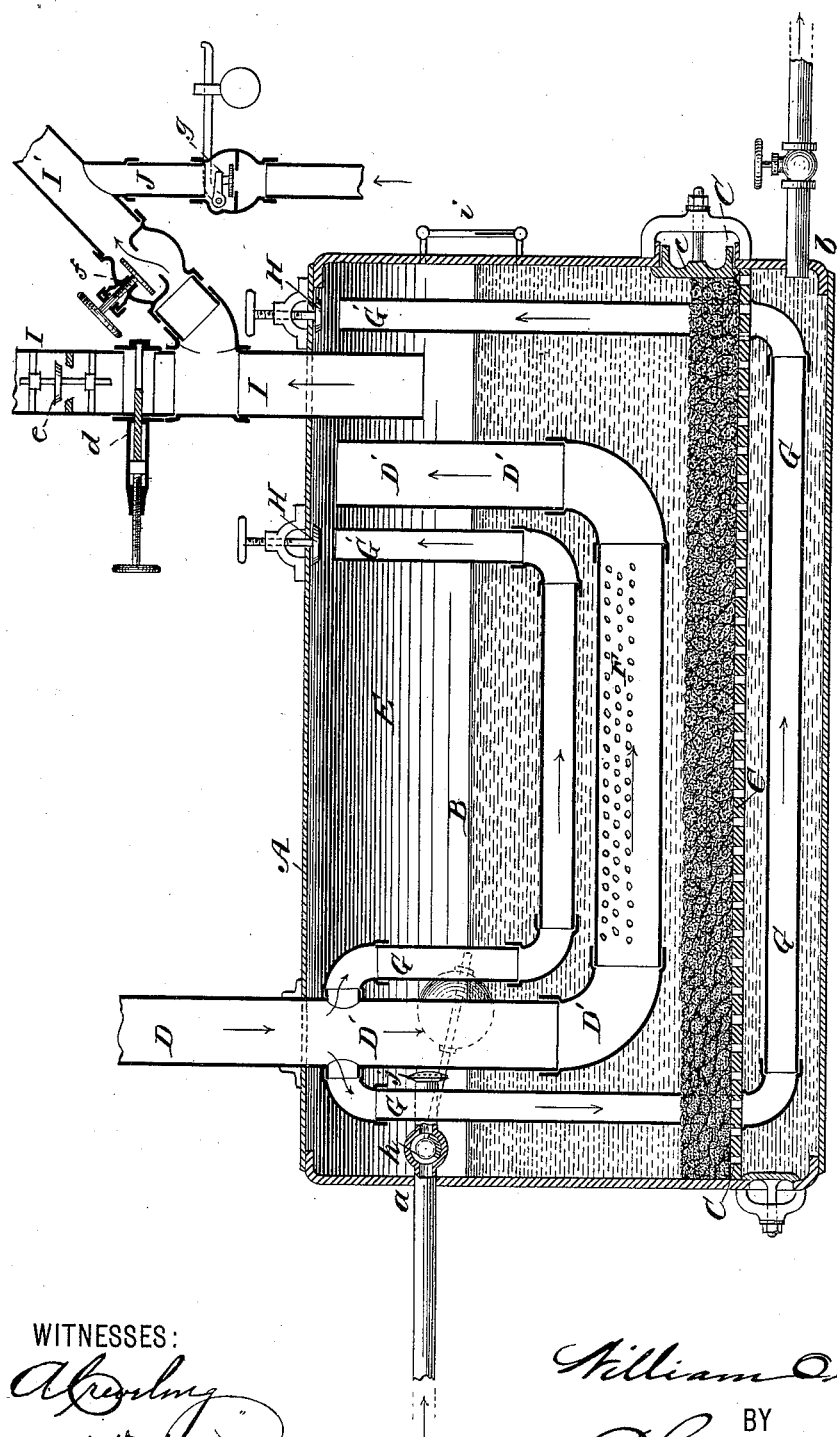

UNITED STATES PATENT OFFICE.

WILLIAM OLIPHANT, OF PATERSON, NEW JERSEY, ASSIGNOR, BY DIRECT AND MESNE ASSIGNMENTS, TO THE OLIPHANT MANUFACTURING COMPANY, OF NEW YORK, N. Y.

FEED-WATER HEATING AND FILTERING APPARATUS.

SPECIFICATION forming part of Letters Patent No. 384,540, dated June 12, 1888.

Application filed January 4, 1887. Renewed February 17, 1888. Serial No. 264,388. (No model.)

*To all whom it may concern:*

Be it known that I, WILLIAM OLIPHANT, a citizen of the United States, residing at the city of Paterson, county of Passaic, State of New Jersey, have invented certain new and useful Improvements in Feed-Water Heating and Filtering Apparatus, of which the following is a specification, reference being had to the accompanying drawing, forming a part of the same.

The object of this invention is to combine in one apparatus means for partially condensing exhaust-steam, utilizing the same for imparting heat to feed-water, and filtering said feed-water at one operation. For these purposes the apparatus consists of certain devices whereby the exhaust-steam from an engine or like source is brought into direct contact with the feed-water and subsequently conveyed to the atmosphere or utilized for other heating purposes, whereby back-pressure in that portion of the exhaust-steam pipe open to contact with the feed-water is relieved at the time of starting the apparatus into action, and of certain other auxiliary devices hereinafter described.

In order that others skilled in the art to which my invention appertains may understand and use the same, I will proceed to describe the details of its construction, explain its operation, and set forth in the appended claims its novel characteristics.

Referring to the drawing, the figure is a longitudinal vertical central section of an apparatus embodying my invention.

The cylindrical shell A, composed, preferably, of boiler-iron, is placed horizontally upon a suitable support, and within the shell A, at a considerable distance below the water-line B, is constructed a horizontal grating or perforated plate, C, extending the entire length and breadth of said shell, so that water entering at *a* and ejected at *b* must pass through said plate or grating. Upon this grating is introduced and evenly distributed through a suitable man-hole, *c*, a supply of pulverized coke, charcoal, or other suitable filtering material. At the top of the shell near one end is introduced the steam-exhaust pipe D, which is prolonged downwardly by its extension D', and thence lengthwise of the shell, and thence upwardly as shown, opening at its mouth to the extreme top of the steam-chamber E, and also having perforated openings F located on the upper side of its section which is lowermost beneath the water-line. In addition to the extension D' are connecting supplemental extensions or relief-pipes, G, the one passing beneath the water at any convenient point above the filtering material, the other passing through that portion of the water beneath said filtering material, and both said relief-pipes opening near the top of the steam-chamber E at G'. The openings G' of the relief-pipes are fitted with valves, as shown, for closing them when required.

At any suitable point on the top of the shell A, and opening at a level beneath that of the pipe-mouths D' G' G' and above that of the water-line, is connected the eduction steam-pipe I, opening, through the sluice or other hand valve, *d*, and check-valve *e*, to the atmosphere, or communicating by a branch pipe, I', through the hand-valve *f*, to a system of heating-coils or other means by which it may be desired to further utilize the exhaust-steam. At a point beyond the valve *f*, I have shown in the drawing a connecting steam-pipe, J, which may be used for substituting live steam to supply heating-coils or the like when the valve *f* is closed. The pipe J is provided with an automatic induction-valve, *g*, which is so counterbalanced as to open and admit steam to the pipe I' when the latter is free from pressure and to close when a slight degree of pressure is admitted through the valve *f* from the heater.

The water-supply pipe *a* is provided with a cock, *h*, which is automatically regulated by the well-known float mechanism so as to maintain a proper water-level, the latter being indicated by a water-gage, *i*. The opening of the pipe *a* is fitted with a perforated cap, *j*, which distributes the water in a spray against the steam, effecting a rapid absorption of heat.

In the operation of the invention the valves H are first opened at the time of starting the engine, so as to relieve to a certain extent the back-pressure otherwise produced by the water which will have entered the pipe D' through the perforations F. The pipes G are, however, of a sufficiently small size to cause the incoming exhaust to discharge the water from the pipe D' and force its way through the perforations as well as through the mouth of said pipe, whence from the latter the chamber E is charged with steam before escaping from the apparatus. The valves H may now be closed or partly closed, causing the bulk of the steam to pass the perforations F in the pipe D'. The lower pipe G is, however, left open preferably, in order to impart additional heat to that portion of the water which has passed the filtering-diaphragm C.

Should the eduction-pipe I be operating in direct communication with the atmosphere, the valve $d$ being open and $f$ closed, the check-valve $e$ will, in case the engine is stopped, automatically close, whereupon the subsequent condensation of steam in the chamber E will produce a vacuum to be afterward utilized upon starting the engine and aid to withdraw the water accumulated in the pipe D'.

Having thus fully described my invention, I claim and desire to secure by Letters Patent—

1. In an exhaust-steam feed-water-heating apparatus, the combination, substantially as shown, with an exterior shell, of an interior exhaust-steam-conducting pipe having perforations at that portion which is immersed beneath the feed-water, and having its ends connected, respectively, to the exterior source of exhaust-steam and to the interior steam-chamber of said shell, and a separate steam-eduction pipe located relatively thereto, as shown.

2. In an exhaust-steam feed-water-heating apparatus, the combination, substantially as shown, with an exterior shell and interior exhaust-steam-conducting pipe having perforations located as shown, of auxiliary relief exhaust-steam pipes connected with said exhaust-pipe at its point of entrance to said shell and immersed in the feed-water for the purpose of conducting through the same a portion of said steam and delivering the latter to the steam-chamber of said shell.

3. In an exhaust-steam feed-water heating and filtering apparatus, the combination of an exterior shell comprising a water-reservoir and steam-chamber, a main steam-exhaust pipe having perforations and steam-chamber communication, as shown, auxiliary exhaust-steam relief-pipes, separate steam-eduction pipe provided with an atmospheric check-valve, a filtering-diaphragm located substantially as shown and described, and means for automatically supplying feed-water above said diaphragm and withdrawing the same from beneath said diaphragm.

WILLIAM OLIPHANT.

Witnesses:
CHAS. W. FORBES,
M. C. FULLERTON.